United States Patent
Yoshida

[11] Patent Number: 5,825,417
[45] Date of Patent: Oct. 20, 1998

[54] EXPOSURE CONTROL DEVICE OF A VIDEO CAMERA AND METHOD THEREFOR

[75] Inventor: Masanori Yoshida, Asaka, Japan

[73] Assignee: Fuji Photo Film Co., Ltd., Kanagawa, Japan

[21] Appl. No.: 825,183

[22] Filed: Mar. 27, 1997

Related U.S. Application Data

[63] Continuation of Ser. No. 557,896, Nov. 14, 1995, abandoned, which is a continuation of Ser. No. 205,741, Mar. 4, 1994, abandoned.

[30] Foreign Application Priority Data

Mar. 31, 1993 [JP] Japan .................................... 5-074258

[51] Int. Cl.$^6$ .................................................. H04N 5/238
[52] U.S. Cl. ......................... 348/364; 396/236; 396/235
[58] Field of Search .................................. 348/362, 363, 348/364, 366; 396/227, 236, 235, 247

[56] References Cited

U.S. PATENT DOCUMENTS

| | | | |
|---|---|---|---|
| 4,505,563 | 3/1985 | Wong et al. | 354/234.1 |
| 4,868,667 | 9/1989 | Tani et al. | 358/228 |
| 4,967,281 | 10/1990 | Takada | 358/229 |
| 5,031,048 | 7/1991 | Naruto et al. | 358/213.19 |
| 5,049,997 | 9/1991 | Arai | 358/213.11 |
| 5,053,877 | 10/1991 | Kodo et al. | 358/228 |
| 5,057,927 | 10/1991 | Hieda | 348/364 |
| 5,065,248 | 11/1991 | Homma | 358/228 |
| 5,130,851 | 7/1992 | Shirie | 359/700 |
| 5,258,848 | 11/1993 | Kondo et al. | 348/363 |
| 5,282,075 | 1/1994 | Sugimori | 348/363 |
| 5,299,015 | 3/1994 | Imaide et al. | 348/364 |
| 5,455,685 | 10/1995 | Mori | 348/366 |

*Primary Examiner*—Sandra L. O'Shea
*Assistant Examiner*—Michael Day

[57] ABSTRACT

An automatic exposure control device of a video camera for recording and tie-recording with proper exposure level including an iris mechanism having a two-fin type iris rotated by a ring portion of which the rotational speed is in proportion to an iris control value while an electric battery is switched on and a photograph button is pushed. Recording is actually started after a predetermined period is passed following the pushing of the photograph button. A photometric integrating circuit outputs an iris integrating value from a brightness element of a photograph signal. A microcomputer determines the iris control value from the iris integrating value. During the predetermined period after the pushing of the photograph button, the iris control value is increased and output for every field in order to control the iris with high speed. After this predetermined period following the pushing of the photograph button, recording is actually operated while the iris control value is decreased and output for every field in order to control the iris with low speed.

16 Claims, 8 Drawing Sheets

EXPOSURE CONTROL DEVICE OF A VIDEO CAMERA AND METHOD THEREFOR

This application is a continuation, of application Ser. No. 08/557,896 filed on Nov. 14, 1995, now abandoned, which was a continuation of application Ser. No. 08/205,741 filed on Mar. 4, 1994, now abandoned.

BACKGROUND OF THE INVENTION

1. Field of the Invention

The present invention relates to an exposure control device of a video camera for proper tie-recording and normal recording with proper exposure level. The tie-recording is successively recording a video tape from a portion at where the former recording is finished.

2. Description of the Background Art

Figure 10:
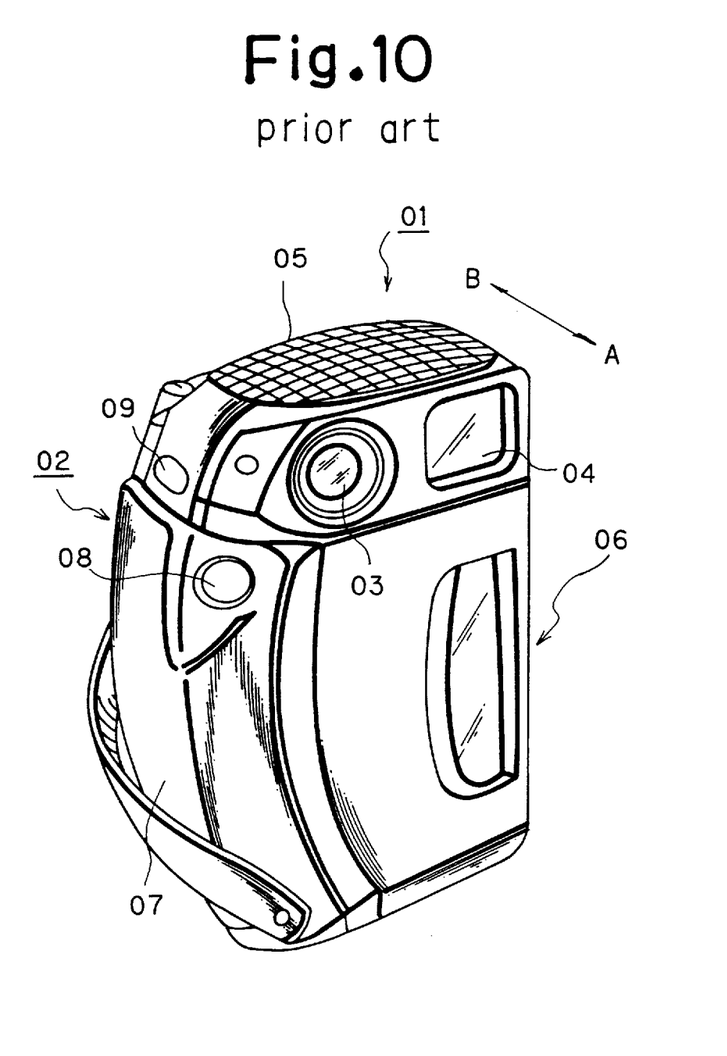
FIG. 10 is a schematic view of a conventional video camera.

A conventional video camera has been developed which is compact and of a portable style, as shown in FIG. 10. In FIG. 10, an outer packaging case 02 of the video camera 01 has a flat, thin wall along a direction from the front to the rear of a camera body (arrows A, B in FIG. 10) of generally rectangular parallel-piped shape. A photographing lens 03 and an optical view finder 04 are mounted on an upper portion of the outer packaging case 02. A stereo microphone 05 is mounted on a top portion of the outer packaging case 02. Numerals 06, 07, 08, and 09 indicate a video tape recorder deck, a side grip portion, a photograph button and a telescopic/wide mode switch button, respectively.

The video camera, as shown in FIG. 10, has a two-fin type iris mechanism to reduce the manufacturing cost. Herein, the iris mechanism is well-known. The two-fin iris is opened/closed by rotating a ring portion of an iris meter. A rotational angle of the iris meter can be detected by an output voltage of a Hall element in the iris meter. A characteristic of the open degree of the iris mechanism of a two-fin iris type is non-linear with respect to a rotational angle of the ring portion of the iris meter. When the open degree is very low, the open degree is remarkably changed even if the rotational angle of the ring portion is changed a little.

In the video camera 01, as shown in FIG. 10, an optical view finder 04 is utilized instead of an electronic view finder, so that an operator can find an object or a sight through the optical view finder 04, even if electric power is turned off. For such a video camera 01, a power save mode can be designed using an integrated circuit.

In the video camera 01 with a power save mode program, while the power switch is shifted to ON and the photograph button 08 is not actuated, electric power is supplied to a part of the mechanical portion and a part of a microcomputer. However, electric power is not supplied to a computing portion of the microcomputer and all of the photographing mechanism so the electric power can be saved. During the operation of such a power saving mode, a rotational drum can be rotated and a mechanism in the microcomputer for detecting sensor signals and an ON/OFF condition of a photograph button is operable. However, electric power is not supplied to a charge coupled device (CCD), an integrating circuit for processing image signals and the computing portion of the microcomputer. Furthermore, the iris is closed. In a condition that the power save mode is operated, a sight or an object can be found through the optical view finder 04 by an operator.

When a power switch is shifted to ON and the photograph button 08 is pushed, the power save mode is released and electric power is supplied to all mechanical and electric mechanisms and a picture image is output from the charge coupled device. If the photograph button 08 is pushed successively or immediately after the power save mode is released, the iris is opened with high speed until an exposure value becomes a proper level. Then, recording is actually started in a few moments (for example, 0.50 second) after pushing the photograph button 08. A reason why the start timing of actual recording is delayed from the moment of pushing the photograph button is due to mechanism delay.

Figure 3:
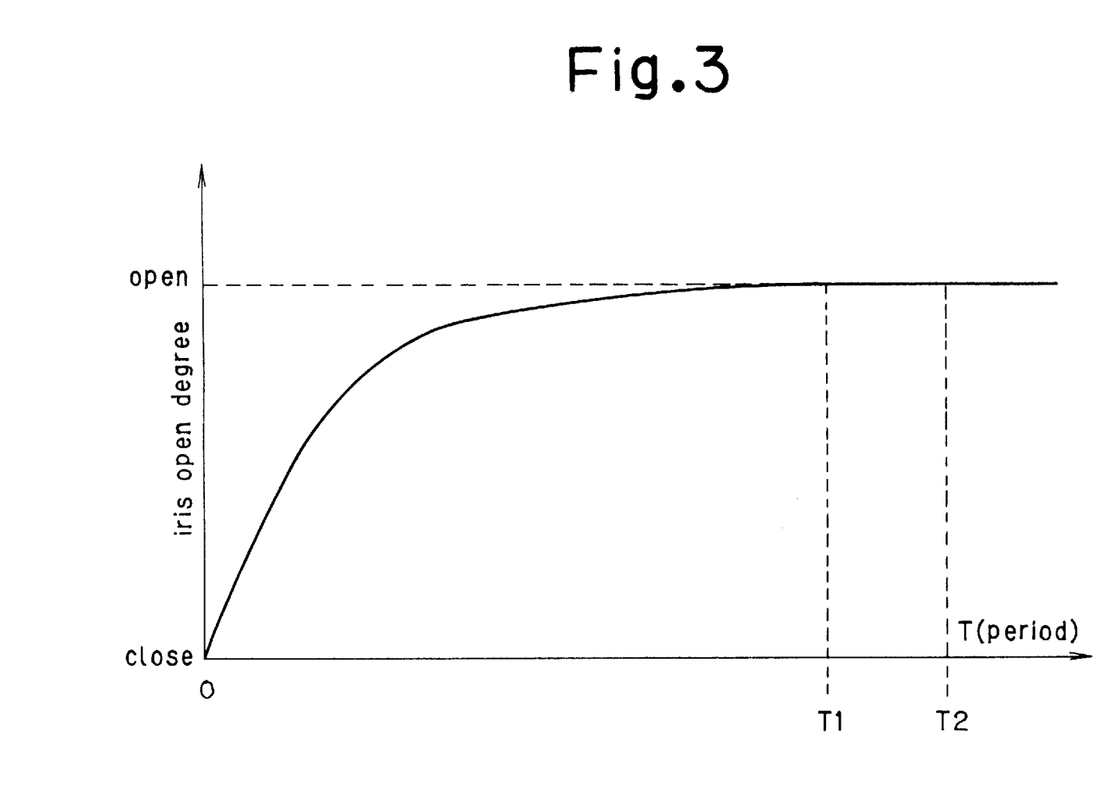
FIG. 3 shows a characteristic of an operation condition of a video camera in view of the relation between an iris open degree and a period after pushing a photograph button.

If the power save mode is released and the recording is actually started, it is preferable to obtain a stable exposure value from the initial stage. Therefore, it is preferable that the exposure control is started from the moment when the photograph button 08 is pushed and an exposure value becomes stable until a moment immediately before the recording is actually started (within a period 0–T2, as shown in FIG. 3).

Generally, an automatic exposure control (auto iris: AE) is utilized in a video camera. In this method, an iris integration value is detected based on a brightness signal of a photograph signal and a photometric value is detected by the iris integration value, and a deviation between the photometric value and a desired value (which is predetermined) is further detected. If the photometric value becomes equal to the desired value, the exposure becomes optimum. An iris control value is detected in accordance with dividing the deviation (=the desired value–the photometric value) by a predetermined number and is output to the iris meter. In the iris meter, the iris is opened/closed by rotating the ring portion with a speed corresponding to the iris control value. Then a value of the brightness signal is changed in accordance with the exposure control. An automatic exposure control is operated by such a feedback control.

The applicants have developed a video camera with a power save mode program in which an automatic exposure operation is started simultaneously with the moment of pushing the photograph button while in the power save mode as a starting point in order to obtain a proper exposure value from the initial stage. However, in a conventional automatic photographing method, a control speed is slow so that an exposure value cannot become stable for a while after starting actual recording (a time period after T1–T2, as shown in FIG. 3). It is necessary to wait some time until the exposure value becomes a proper value. Therefore, a proper exposure cannot be obtained for a while from the moment of starting actual recording and recording is not operated properly so that a tie-recording becomes unnatural.

If the exposure control speed is merely increased in order to resolve the above-described problem, a control value in the exposure control system results in over-shooting or hunting occurs in the case that a brightness level of an object is rapidly changed so that the exposure becomes unstable and recording becomes improper.

Furthermore, in a video camera with an iris mechanism having a two-fin iris and a feedback type automatic exposure control program, a ratio of change in an open degree of the iris, that is, a ratio of change in a value of a brightness signal is not in proportion to a rotational angle of a ring portion of an iris meter (see FIG. 2) Therefore, the following drawbacks result.

A. Due to a ratio of change in a value of a brightness signal failing to be constant, a brightness of a recorded picture image is unnatural.

B. Due to an open degree of an iris being rapidly changed with respect to a rotational angle of a ring portion in the case when a brightness level of an object is high (the iris is almost closed), hunting is likely to occur.

If the control speed is merely decreased in order to avoid hunting and an unnatural change of brightness, a ratio of change in the open degree of the iris is too slow and a proper exposure cannot be obtained in the case that a brightness level of an object is low (the iris is almost opened).

SUMMARY OF THE INVENTION

A purpose of the present invention is to provide an exposure control device for a video camera which enables recording of a picture image with a proper exposure level from the initial stage and successively tie-recording a picture image with a proper exposure level in the case when a mode of the video camera is shifted from the power save mode to the actual recording mode.

Another purpose of the present invention is to provide an exposure control device for a video camera which enables recording of a picture image simultaneously while controlling an open degree of an iris in a broad range from the high open degree (low brightness) to the low open degree at a proper ratio of change of brightness. Further, the video camera according to the present invention can photograph an object having a high brightness level without hunting.

To resolve the above-described problems, an exposure control device of a video camera according to an embodiment of the present invention includes an iris mechanism having an iris and a ring portion, wherein the iris is opened/closed in accordance with rotation of the ring portion and the rotational speed of the ring portion is in proportion to an iris control value E0, a photograph circuit which forms a photgraph signal corresponding to an optical picture image incident thereon through the iris mechanism, a photometric integrating circuit which determines an iris integrating value EI based on a brightness element of the photograph signal, a microcomputer which determines a photometric value DP from the iris integrating value EI and a deviation $\Delta$ by subtracting the photometric value DP from a desired value OP and which outputs an iris control value E0 in accordance with the deviation, wherein the microprocessor increases the iris control value E0 with respect to the deviation in the case when the deviation is greater than a predetermined value or during a predetermined period beginning with pushing a photograph button, and output the iris control value E0 for each field. On the other hand, the microcomputer decreases the iris control value E0 with respect to the deviation in the case when the deviation is less than the predetermined value or after passing over the predetermined period, and outputs the iris control value E0 for every few fields.

Under the above-described first embodiment, an exposure value becomes stable and is converged after pushing the photograph button and before starting the actual recording. As a result, an optimum exposure value can be obtained at an initial stage of recording.

To resolve the above-described problems, an exposure control device of a video camera according to another embodiment of the present invention includes an iris mechanism having an iris and a ring portion, wherein the iris is opened/closed in accordance with the rotation of the ring portion and the rotational speed of the ring portion is in proportion to an iris control value E0, a photograph circuit for forming a photograph signal corresponding to an optical picture image through the iris mechanism, a photometric integrating circuit for determining an iris integrating value EI based on a brightness element of the photograph signal, a microcomputer for determining a photometric value DP from the iris integrating value EI and a deviation $\Delta$ by subtracting the photometric value DP from a desired value OP and outputting an iris control value E0 in accordance with the deviation, wherein the microcomputer memorizes a plurality of linear lines which approximate characteristic of an open degree of the iris determined by a relation between a rotational position of the ring portion of the iris mechanism and the open degree of the iris for determining the iris control value E0 in accordance with an inclination of the corresponding linear lines.

Under the above-described second embodiment, even if a characteristic of an open degree of an iris is non-linear, a ratio of a change in the open degree of the iris is constant for a whole range with respect to time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are give by way of illustration only, and thus are not limitative of the present invention and wherein.

DETAILED DESCRIPTION OF THE PREFERRED EMBODIMENTS

Figure 1:
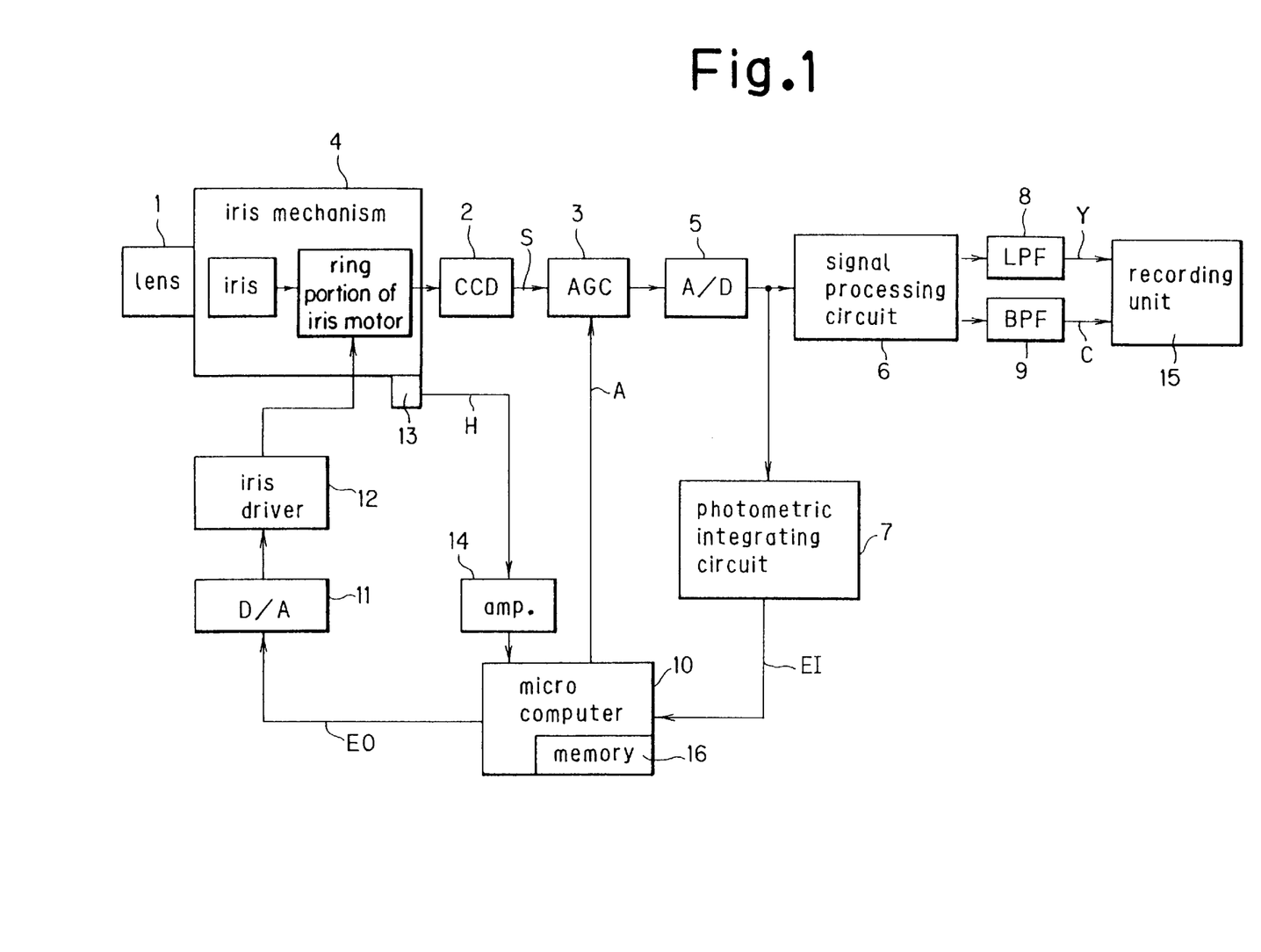
FIG. 1 is a block diagram of a video camera system according to an embodiment of the present invention.

FIG. 1 shows one of the embodiments of a video camera system according to the present invention. As shown in FIG. 1, an image is formed on a light receiving surface of a charge coupled device (CCD) 2 through an iris mechanism 4 of a lens portion 1. Then, a photograph signal S is output from the CCD 2. The photograph signal S is input to an automatic gain control (AGC) circuit 3 and then is converted to a digital signal by an analog/digital convertor 5. The Digital signal is input to a signal processing circuit 6 and a photometric integrating circuit 7. The iris mechanism 4 is a two-fin iris type. The video camera has an optical view finder with a power save mode mechanism.

In the signal processing circuit 6, the input signal is divided into a brightness signal (element) and a color signal and correction and white balance control are processed. A brightness signal Y is output from a low-pass filter 8 successively connected to the signal processing circuit 6 and a color signal C is output from a band-pass filter 9. Recording unit 15 records the image on a recording medium in accordance with the brightness signal Y and color signal C.

In the photometric integrating circuit 7, a brightness signal of the photograph signal S is integrated and then an iris integrating value EI is calculated for each one of the fields. The iris integrating value EI is output to a microcomputer 10.

In the microcomputer 10, a photometric value DP is determined based on the iris integrating value EI. A desired value OP is initially determined. If the photometric value DP is changed to the desired value OP, the condition becomes an optimal exposure condition. The microcomputer 10 detects a deviation $\Delta$ (=OP−DP) by subtracting the photometric value DP from the desired value OP and further outputs an iris control value E0 in accordance with the deviation $\Delta$. The iris control value E0 is determined by multiplying the deviation $\Delta$ by a predetermined value, stored in memory 16. As described below, in the present embodiment, the predetermined value is changed corresponding to photographing condition and a period of outputting the iris control value E0 is controlled.

Figure 2:
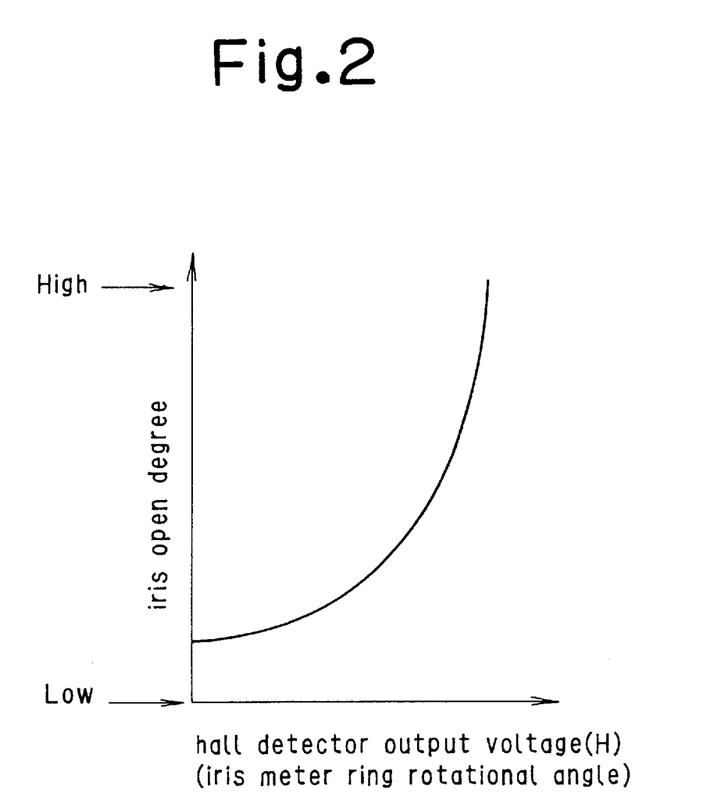
FIG. 2 shows a characteristic of an open degree of an iris with respect to a rotational angle of an iris meter.

The iris control value E0 output from the microcomputer 10 is converted to an analog signal by a digital/analog convertor 11 and transmitted to an iris driver 12 so that an iris meter of the iris mechanism 4 can be actuated and the iris open degree of the two-fin iris can be changed. A rotational speed (angle) of a ring portion of the iris meter is in proportion to the iris control value E0. A Hall element 13 is attached to the iris mechanism 4. A relation between an output voltage H (rotational angle of the iris meter) and an iris open degree Av (aperture value) is non-linear as shown in FIG. 2. The Hall element voltage H is amplified by an amplifier 14 and input to the microcomputer 10. As described above, exposure feedback control is operated. An automatic exposure system includes the photometric integrating circuit, the microcomputer 10, the digital/analog convertor 11, the iris driver 12, the iris mechanism 4, the Hall element 13 and the amplifier 14.

If the iris is fully opened and the exposure condition is still insufficient, the microcomputer 10 outputs a command A in order to increase a gain of the AGC circuit 3. When actual recording is started after releasing the power save mode, an operation of a mode in which an iris is controlled in order to expose properly from an initial moment of the actual recording will be explained.

In the video camera system, as shown in FIG. 1, when a power save mode is released by pushing a photograph button and an actual recording is started after a certain period (for example, 0.50 second), an optimum exposure can be obtained from an initial time as described below.

Figure 4:
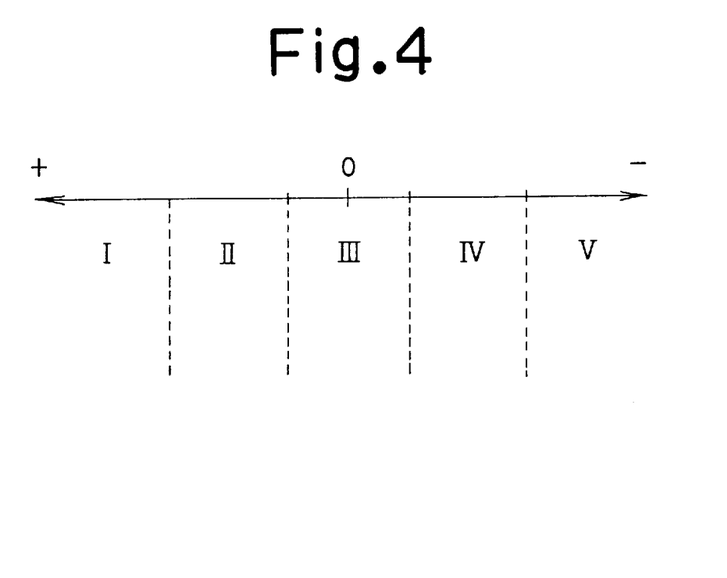
FIG. 4 shows deviation regions divided depending on the amount of the deviation.
Figure 5:
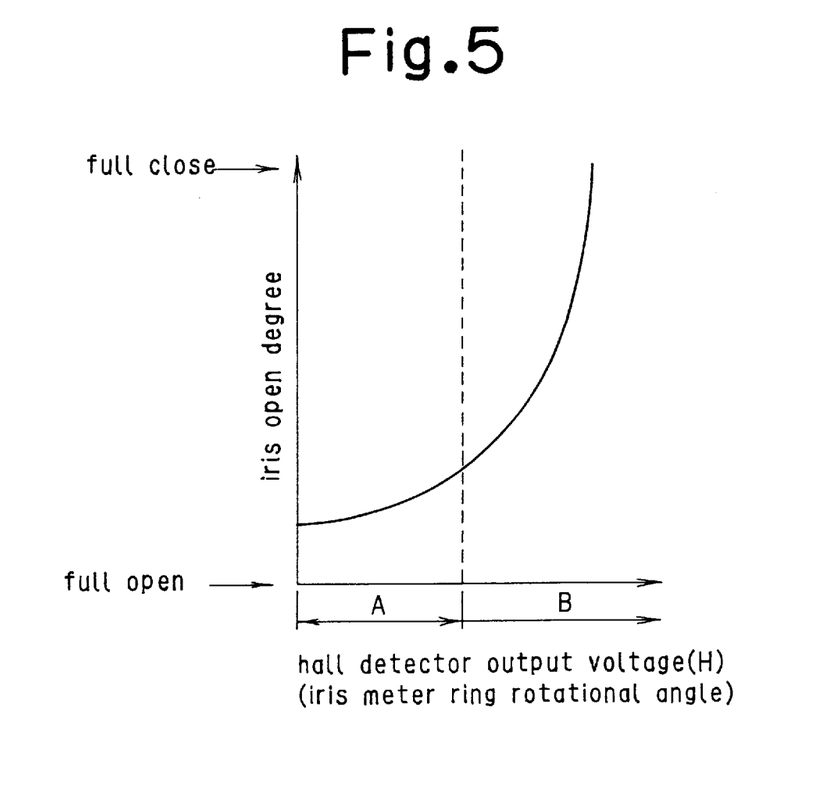
FIG. 5 shows a characteristic of the iris in view of a relation between an iris open degree and a rotational angle of an iris meter.
Figure 6:
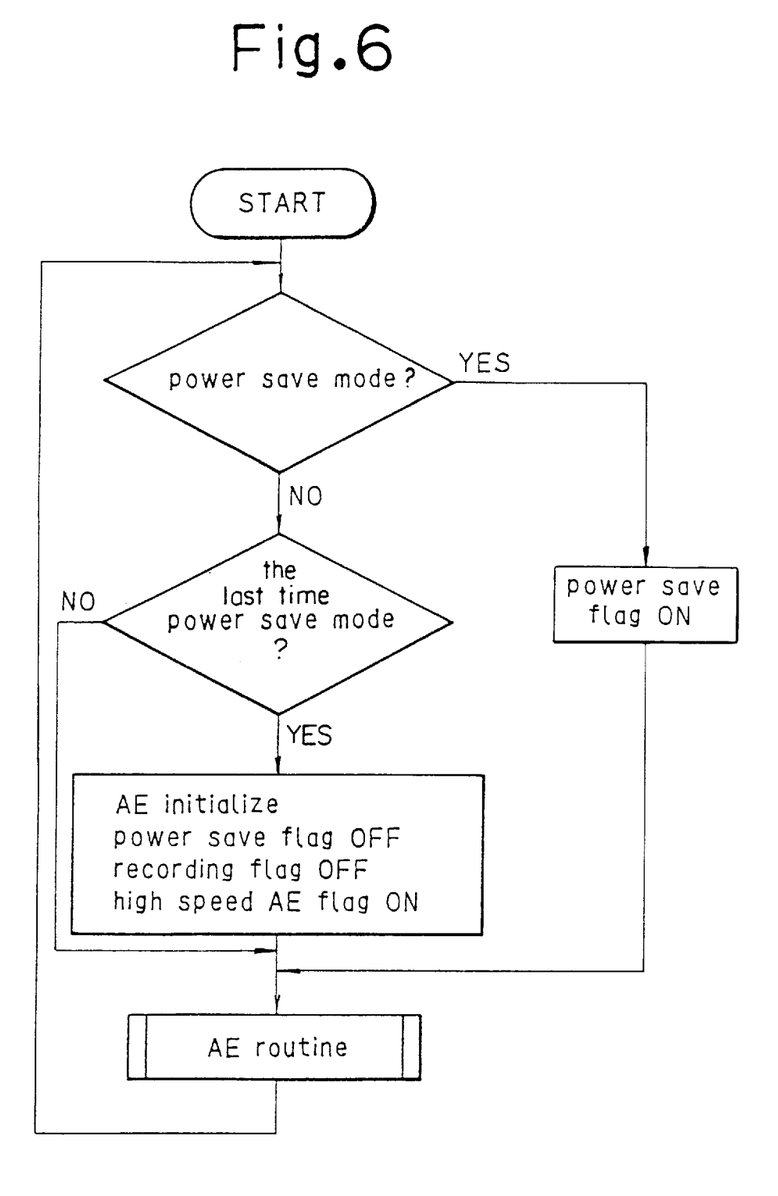
FIG. 6 shows a flow chart of a power save control mode.
Figure 7:
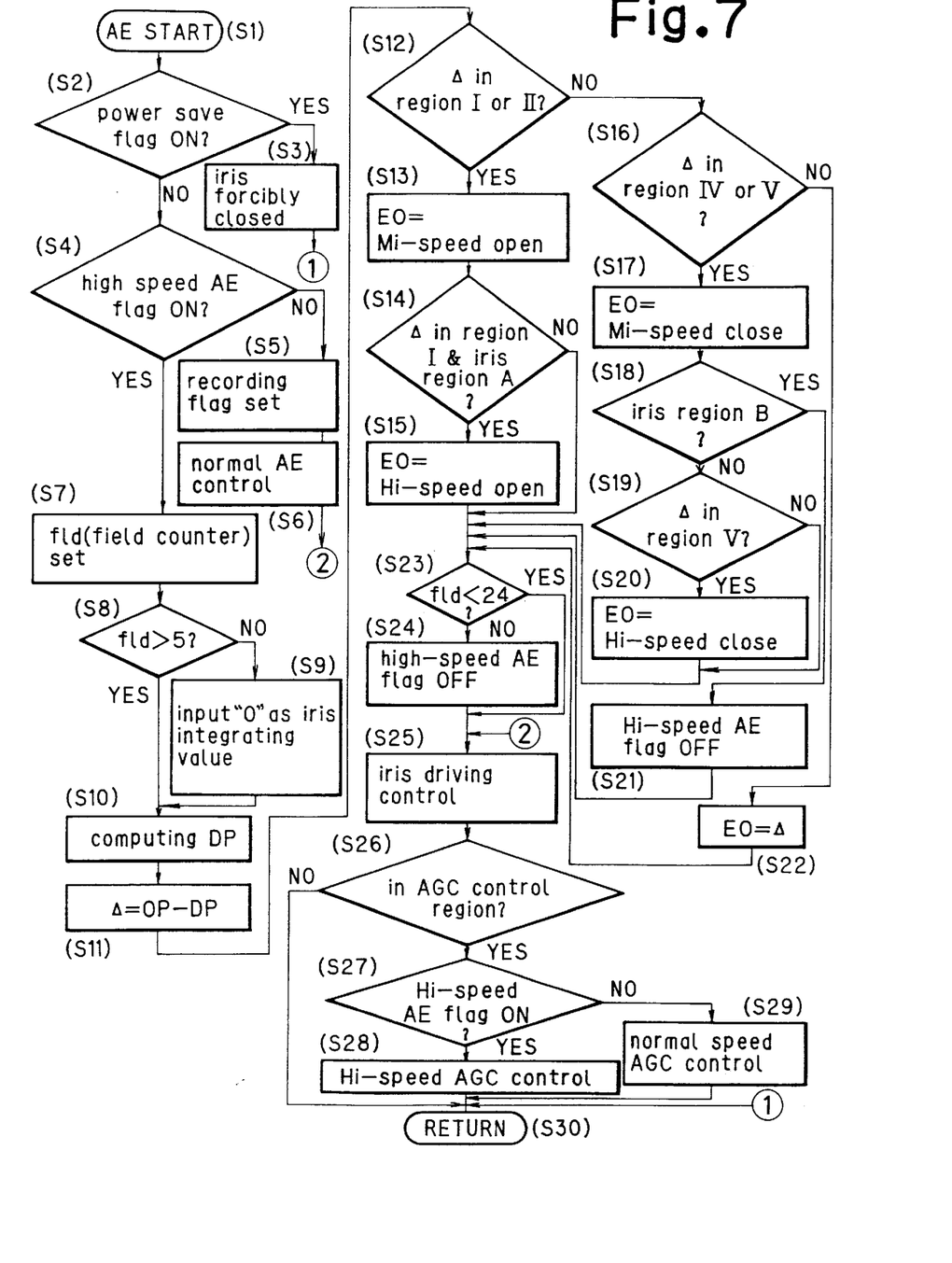
FIG. 7 shows a flow chart of a detailed exposure control operation.

FIG. 3 shows a relation between an iris open degree and a period after the photograph button is pushed. Until the period 0–T1 elapses, the iris open degree is insufficient to record with a proper exposure value. At the moment T1, the iris becomes stable. After a few moments (T1–T2), actual recording begins at the time T2. FIG. 4 shows some deviation regions. FIG. 5 shows iris regions. With reference to FIGS. 3 through 5, a control operation will be explained. FIGS. 6 and 7 show flow charts of a power save control mode. With reference to FIGS. 6 and 7, the detailed control operation will be explained.

In FIG. 4, if a deviation $\Delta$ is positive and its amount is a very large value, i.e., the deviation belongs to the first region I, then the exposure is much less than the reference level and the iris open degree is too low. If a deviation $\Delta$ is positive and its amount is large but less than the values for the first region, i.e., the deviation belongs to the second region II, then the exposure is a little less than the reference level and the iris open degree is slightly low. If a deviation $\Delta$ is zero or nearly equal to zero, i.e., the deviation belongs to the third region III, then the exposure and the iris open degree are proper. If a deviation $\Delta$ is negative and its amount is large, i.e., the deviation belongs to the fourth region IV, then the exposure is slightly extreme and the iris open degree is slightly high. If a deviation $\Delta$ is negative and its amount is greater than the fourth region IV, i.e., the deviation belongs to the fifth region V, it means that the exposure is to extreme and the iris open degree is too high.

In FIG. 5, a vertical axis indicates the iris open degree (aperture value) AV and a horizontal axis indicates the Hall element output voltage H or an iris meter ring rotational angle. In the iris region A, a rate of change in the iris open degree is low with respect to the rotational angle of a ring portion of an iris meter. In the iris region B, the rate of change in the iris open degree is high with respect to the rotational angle of the ring portion of the iris meter.

In the present embodiment, in order to obtain a proper exposure value for starting actual recording, the iris is specifically controlled within the period 0~T2 (from pushing the photograph button to the moment immediately before actual recording), as shown in FIG. 3. After passing over the time T2, a normal exposure is automatically controlled.

In the period 0–T2, the iris control value E0 is forcibly controlled to zero and the iris mechanism 4 cannot be controlled within the first five fields after pushing the photograph button. When the iris begins to open, the brightness signal is unstable and the iris integrating value E1 is unstable, so that speed control of the iris mechanism to avoid a wrong speed is not commenced. After passing the first five fields and until the 24th field, the iris control value E0 is output for each one of the fields. The mode of the iris control value E0 is switched to each mode, i.e., a high speed open mode, a middle speed open mode, a high speed close mode, a middle speed close mode, a semi-normal open/close control and a normal open/close control corresponding to the condition of the deviation $\Delta$ and the iris.

The modes of the iris control value E0 are determined by the microcomputer 10, as follows:

Mode (a) the deviation $\Delta$ belongs to the region I (see FIG. 4) and the iris belongs to the iris region A (see FIG. 5), the mode is switched to the high speed open mode;

Mode (b) the deviation $\Delta$ belongs to the region I and the iris belongs to the iris region B, or the deviation $\Delta$ belongs to the region II and the iris belongs to the iris regions A or B, the mode is switched to the middle speed open mode;

Mode (c) the deviation $\Delta$ belongs to the region V and the iris belongs to the iris region A, the mode is switched to the high speed close mode;

Mode (d) the deviation $\Delta$ belongs to the region IV and the iris belongs to the iris region A, the mode is switched to the middle speed close mode;

Mode (e) the deviation $\Delta$ belongs to the regions IV or V and the iris belongs to the iris region B, the mode is switched to the normal open/close control mode; and Mode (f) the deviation $\Delta$ belongs to the region III, the mode is switched to the semi-normal open/close control mode.

The rotational speed of the ring portion of the iris meter is changed depending on the iris control value E0. In each mode, the iris control value E0 is determined, as shown in the following Table 1.

TABLE I

| Mode | E0 equation |
| --- | --- |
| 1 Hi-speed open/Hi speed close | E0 = Δ × C1 |
| 2 Hi-speed open/Hi speed close | E0 = Δ × C2 |
| 3 semi-normal open/close control | E0 = Δ |
| 4 normal open/close control | E0 = Δ ÷ C3 |

C1, C2 and C3 are constants which are greater than 1 and C1 is greater than C2. Opening/closing depends on whether the iris control value E0 is positive or negative.

Regarding the deviation Δ, the greater the deviation Δ is, the faster the iris open/close speed becomes. Furthermore, in order to obtain a stable exposure value as early as possible, the iris open/close speed in the iris region B is faster than the iris open/close speed in the iris region A. The iris control value E0 is output for each field so that the exposure is converged at a high speed.

In a period after T2, the iris control value E0 is output for every few fields so that the iris control value E0 is determined by the fourth equation in Table 1 in a similar manner as in the conventional method.

FIG. 6 shows a flow chart of a power save control mode. As shown in FIG. 6, if the power save mode is switched on, the flow chart is advanced to an automatic exposure routine. If the power save mode is switched off, and if the power save mode was on in the preceding control period, the automatic exposure is initialized, the power save flag is set OFF, a recording flag is set OFF and a high speed automatic exposure flag is set ON. Then the operation is advanced to the automatic exposure routine.

FIG. 7 shows a flow chart of a detailed exposure control operation. The automatic exposure is actuated for every one of the fields (STEP 1) and it is judged whether or not the power flag is ON (STEP 2). In the power save mode, if the power save flag is ON, the iris is forcibly closed (STEP 3). On the other hand, if the power save flag is OFF, it is judged whether or not the high speed automatic exposure flag is ON (STEP 4). Unless the high speed automatic exposure flag is ON, the recording flag is set (STEP 5), the normal automatic exposure control (normal open/close control) is operated (STEP 6), the microcomputer 10 outputs the iris control value E0 (corresponding to the normal open/close control) and then the operation is advanced to the iris driving control step (STEP 25).

If the high speed automatic exposure flag is ON (STEP 4), a field counter is set (STEP 7). The field counter counts the number of fields after pushing the photograph button. If the number counted by the field counter is equal to or less than 5 (STEP 8), the iris integrate value EI forcibly becomes zero (STEP 9). A photometric value DP is calculated from the iris integrate value EI (STEP 10) and then a deviation Δ is calculated (STEP 11).

It is judged whether or not the deviation belongs to the regions I or II (STEP 12). If it is judged as YES at STEP 12 (that the deviation is in regions I or II), the iris control value E0 is shifted to a value corresponding to the middle speed open mode (STEP 13). Further, in STEP 14, it is judged whether or not the deviation belongs to the region I and the iris belongs to the iris region A. If it is judged as YES at STEP 14 (i.e. the deviation is in region I and the iris is in the iris region A), the iris control value E0 is shifted to a value corresponding to the high speed open mode. As a result, the above-described modes (a) and (b) are operated along the STEPS 12 through 15.

If it is judged as NO in STEP 12 (as the deviation failing to belong in the regions I or II), it is judged whether or not the deviation belongs to the regions IV or V (STEP 16). If it is judged as YES at STEP 16 (i.e. the deviation is in the regions IV or V), the iris control value E0 is shifted to a value corresponding to the middle speed close mode (STEP 17). If the iris does not belong to the iris region B (it is judged as NO in STEP 18) and the deviation belongs to the region V (it is judged as YES in STEP 19), the iris control value E0 is shifted to a value corresponding to the high speed close mode. As a result the above-described modes (c) and (d) are operated along STEPS 16 through 20.

If it is judged that the iris belongs to the iris region B in STEP 18, the high speed automatic exposure flag is turned OFF and the mode is turned to the normal open/close control mode. That is, the above-described mode (e) is operated.

If it is judged that the deviation does not belong to the regions IV or V is STEP 16, i.e., it is judged that the deviation belongs to the region III, the mode is turned to the semi-open/close control mode in which the iris control value E0 is equal to the value of the deviation (STEP 22). That is, the above-described mode (f) is operated.

After the mode is determined, it is judged whether or not the counting number counted by the field counter is less than 24 (STEP 23). If it is judged as NO in STEP 23 (the field counter is greater than or equal to 24), the high speed automatic exposure flag is turned OFF (STEP 24) and the operation is advance to STEP 25. If it is judged as YES in STEP 23 (the field counter is less than 24), the flow chart is directly advanced to STEP 25.

In the STEP 25, the microcomputer 10 actually outputs the iris control value E0 determined in each mode and the rotational speed of the ring portion of the iris meter of the iris mechanism 4 (iris open/close speed) is controlled. Until STEP 25, such an iris open/close speed control is operated.

After the iris control is finished, it is judged whether or not the automatic gain control is in the automatic gain control region ∝ (STEP 26). Such a judgment is operated based on the characteristic shown in FIG. 8. If it is judged that the automatic gain control belongs to the AGC region ∝ (STEP 27), it is judged whether or not the high speed automatic exposure flag is ON (STEP 28). If it is judged as YES at STEP 27 (that the high speed automatic exposure flag is ON), the gain is controlled at high speed in the automatic gain control circuit 3 (STEP 28). If it is judged as NO at STEP 27 (that the high speed automatic exposure flag is OFF), the gain is controlled at normal speed int eh automatic gain control circuit 3 (STEP 29). An then, the operation is finished. If it is judged that the automatic gain control belongs to an AGC region β (STEP 26), the operation is finished without actuating the automatic gain control (STEP 30).

The control, as shown in FIG. 7, is operated for every one of the fields so that it is possible to control the exposure value automatically at high speed without having overshooting and hunting occur during the period T2 (as shown in FIG. 3) resulting from pushing the photograph button until the moment immediately before actual recording is started. Even if the period T1 is very short, the exposure value can be stably converged. Accordingly, even if the actual recording is started immediately, the exposure can become stable and the proper tie-recording can be operated.

In the case of normal recording, an operation of a mode in which light intensity is varied at optimum speed at any open degree of the iris will be explained.

This operation described next controls the iris with proper speed without having any hunting occur within a broad range from a low brightness level (the iris open degree is low).

In a video camera with an iris mechanism having a two-fin iris, as shown in FIG. 2, the ratio of change of the iris open degree in non-linear with respect to the rotational angle of the ring portion of the iris meter. When a level is in the high brightness level (the iris open degree is low), even if the rotational angle of the ring portion is small, the iris opening degree is rapidly changed so that hunting is apt to occur. According to the present embodiment, the above-described problem can be resolved.

Figure 8:
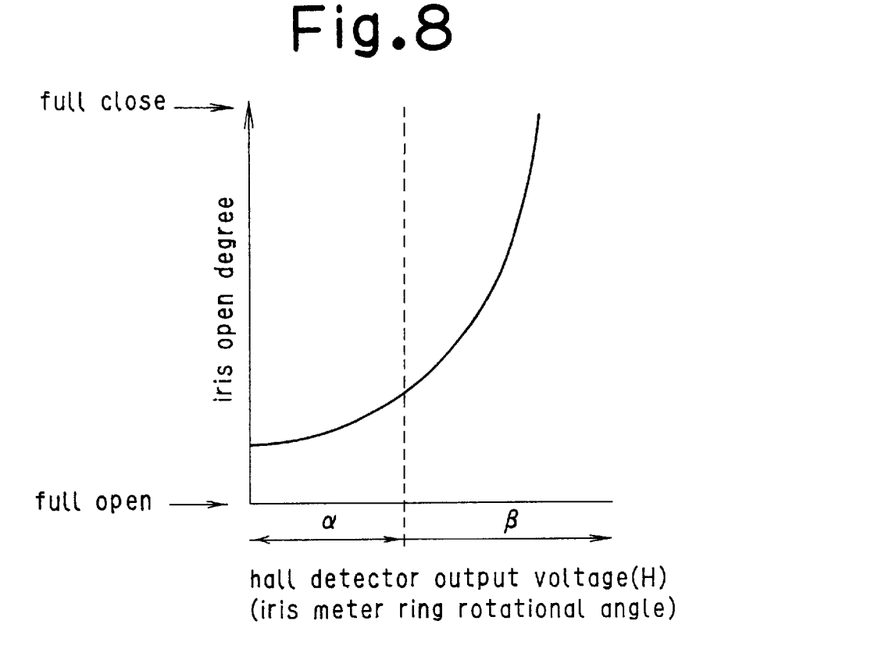
FIG. 8 shows a relation between automatic gain control regions and the iris open degree.
Figure 9:
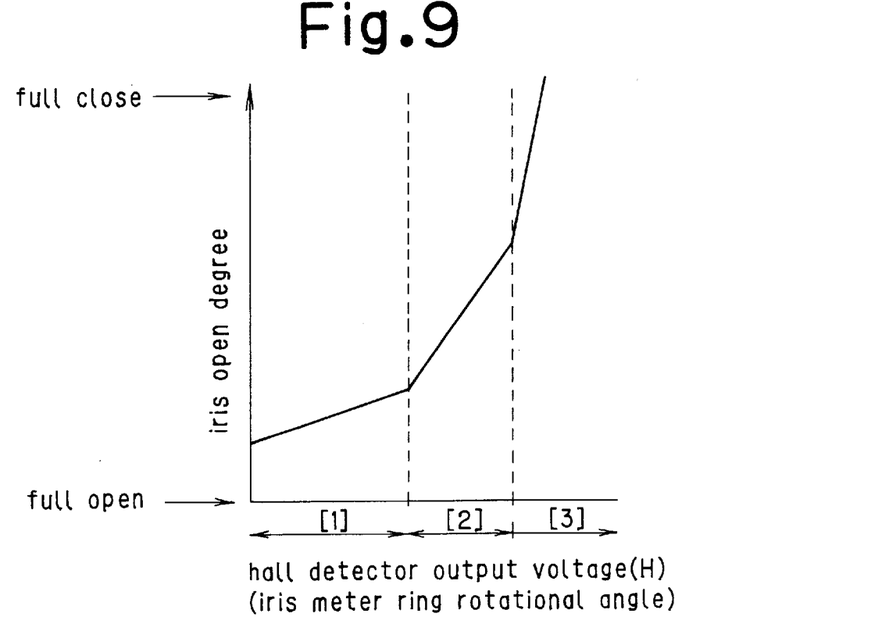
FIG. 9 shows approximate lines of the characteristic of the open degree of the iris.

That is, as shown in FIG. 9, three linear lines are approximated and memorized in the microcomputer 10 instead of the non-linear line shown in FIG. 8. If the rotational angle belongs to a rotational angle region [1], the rotation of the ring portion of the iris is controlled with high speed. If the rotational angle belongs to a rotational angle region [2], the rotation of the ring portion is controlled with a medium speed. If the rotational angle belongs to a rotational angle region [3], the rotation of the ring portion is controlled with low speed.

The microcomputer 10 outputs the iris control value E0 in accordance with the following equation in Table 2. As described above, the brightness can be controlled with constant speed within the broad range from a state in which the iris is almost released and to another state in which the iris is almost closed. In addition, in the case of the state in which the iris is almost closed when a high brightness object is photographed, hunting can be prevented.

TABLE 2

| Rotational angle region [ ] | control speed of ring portion | Equation |
| --- | --- | --- |
| Region [1] | high speed | $E0 = \Delta \div H1$ |
| Region [2] | medium speed | $E0 = \Delta \div H2$ |
| Region [3] | low speed | $E0 = \Delta \div H3$ |

H1, H2 and H3 are constants which are greater than or equal to 1.

H1<H2<H3

According to the present embodiment, when the recording is operated, the exposure can be stabilized from the initial stage and a proper tie-recording can be operated.

Furthermore, according to the present embodiment, the ratio of change in the iris open degree can become constant with respect to the rotational angle of the ring portion of the iris mechanism, so that a proper brightness can be obtained without hunting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An exposure control device of a video camera comprising:

an iris mechanism having an iris and a ring portion, wherein said iris is opened/closed in accordance with rotation of said ring portion and a rotational speed of said ring portion is in proportion to an iris control value;

a photograph circuit means for receiving an optical picture image through said iris mechanism and forming a photograph signal corresponding to the optical picture image;

a photometric integrating circuit for determining an iris integrating value based on a brightness element of said photograph signal; and a microcomputer for determining a photometric value from said iris integrating value and generating a deviation by subtracting said photometric value from a desired value and for outputting said iris control value in accordance with said deviation;

wherein after a photograph button is pushed, said microcomputer counts each field and increases said iris control value with respect to said deviation when said deviation is greater than a predetermined value and outputs said iris control value for each field, and on the other hand, said microcomputer decreases said iris control value with respect to said deviation when said deviation is less than said predetermined value and outputs said iris control value for every few fields, so that a high speed automatic exposure control is achieved.

2. An exposure control device of a video camera claimed in claim 1, wherein the video camera further comprises an optical view finder for finding the optical picture image to be received by said photograph circuit means.

3. An exposure control device of a video camera claimed in claim 1, wherein said photometric integrating circuit forcibly outputs a zero signal as said iris integrating value within a predetermined period after pushing a photograph button on the video camera.

4. An exposure control device of a video camera claimed in claim 1, wherein said microcomputer increases said iris control value when an open degree of said iris is relatively low.

5. An exposure control device of a video camera claimed in claim 1, wherein said microcomputer increases said iris control value in accordance with an open degree of said iris when said deviation is greater than said predetermined value or within a predetermined period after pushing a photograph button on the video camera.

6. An exposure control device of a video camera claimed in claim 1, wherein the video camera includes means for recording an image, which starts to record when said deviation is less than said predetermined value.

7. An exposure control device of a video camera claimed in claim 1, further comprising:

recording means for recording the photograph signal after the high speed automatic exposure control is achieved.

8. An exposure control device of a video camera comprising:

an iris mechanism having an iris and a ring portion, wherein said iris is opened/closed in accordance with rotation of said ring portion and a rotational speed of said ring portion is in proportion to an iris control value;

a photograph circuit means for receiving an optical picture image through said iris mechanism and forming a photograph signal corresponding to the optical picture image;

a photometric integrating circuit for determining an iris integrating value based on a brightness element of said photograph signal; and a microcomputer for determining a photometric value from said iris integrating value and generating a deviation by subtracting said photometric value from a desired value and for outputting said iris control value in accordance with said deviation;

wherein said microcomputer counts each field and increases said iris control value with respect to said deviation within a predetermined period after pushing a photograph button on the video camera and outputs said iris control value for each field and on the other hand, said microcomputer decreases said iris control value with respect to said deviation when said predetermined period is elapsed and outputs said iris control value for every few fields, so that a high speed automatic exposure control is achieved.

9. An exposure control device of a video camera claimed in claim 8, wherein the video camera further comprises an optical view finder for finding the optical picture image to be received by said photograph circuit means.

10. An exposure control device of a video camera claimed in claim 8, wherein said photometric integrating circuit forcibly outputs a zero signal as said iris integrating value within said predetermined period after pushing said photograph button.

11. An exposure control device of a video camera claimed in claim 8, wherein said microcomputer increases said iris control value when an open degree of said iris is relatively low.

12. An exposure control device of a video camera claimed in claim 8, wherein said microcomputer increases said iris control value in accordance with an open degree of said iris when said deviation is greater than said predetermined value or within said predetermined period after pushing said photograph button.

13. An exposure control device of a video camera claimed in claim 8, wherein the video camera includes means for recording an image, which starts to record after elapse of said predetermined period following the pushing of said photograph button.

14. An exposure control device of a video camera claimed in claim 8, further comprising:

recording means for recording the photograph signal after the high speed automatic exposure control is achieved.

15. A method for controlling exposure of a video camera, comprising the steps of:

receiving an optical picture of an image through an iris mechanism comprising an iris and a ring portion;

opening and closing said iris by rotating said ring portion;

determining a rotational speed of said ring portion which is in proportion to an iris control value;

forming a photograph signal corresponding to said optical picture of said image received at said receiving step;

determining an iris integrating value based on a brightness element of said photograph signal;

determining a photometric value from said iris integrating value;

generating a deviation by subtracting said photometric value from a desired value and outputting said iris control value in accordance with said deviation;

counting each field after a photograph button is pushed;

increasing said iris control value with respect to said deviation when said deviation is greater than a predetermined value and outputting said iris control value for each field; and decreasing said iris control value with respect to said deviation when said deviation is less than said predetermined value and outputting said iris control value for every few fields, whereby a high speed automatic exposure control is achieved prior to actual recording.

16. A method for controlling exposure of a video camera claimed in claim 15, wherein said step of determining the iris integrating value forcibly outputs a zero signal as said iris intergrating value within a predetermined period after pushing a photograph button on the video camera.

* * * * *